(12) United States Patent
Driscoll et al.

(10) Patent No.: US 10,839,449 B2
(45) Date of Patent: Nov. 17, 2020

(54) SYSTEM FOR FACILITATING THE ORDERING OF SUPPLIES USING A TRANSLATED NATIVE SUPPLY LIST

(71) Applicant: SCHOOL FAMILY MEDIA, INC., Wrentham, MA (US)

(72) Inventors: John Driscoll, Medfield, MA (US); John Kirby, Milton, MA (US); Dyanne Griffin, Mentham, MA (US); Tim Sullivan, Attleboro, MA (US)

(73) Assignee: SCHOOL FAMILY MEDIA, LLC, Wrentham, MA (US)

( * ) Notice: Subject to any disclaimer, the term of this patent is extended or adjusted under 35 U.S.C. 154(b) by 514 days.

(21) Appl. No.: 15/652,371

(22) Filed: Jul. 18, 2017

(65) Prior Publication Data

US 2018/0025409 A1    Jan. 25, 2018

Related U.S. Application Data

(60) Provisional application No. 62/416,192, filed on Nov. 2, 2016, provisional application No. 62/363,975, filed on Jul. 19, 2016.

(51) Int. Cl.
    *G06Q 30/06* (2012.01)
    *G06Q 50/20* (2012.01)
    *G06Q 10/08* (2012.01)

(52) U.S. Cl.
    CPC ....... *G06Q 30/0635* (2013.01); *G06Q 10/087* (2013.01); *G06Q 50/20* (2013.01)

(58) Field of Classification Search
    CPC ..... G06Q 30/06; G06Q 30/0601–0643; G06Q 30/08; G06Q 50/20; G06Q 50/205
    See application file for complete search history.

(56) References Cited

U.S. PATENT DOCUMENTS

| | | | | |
|---|---|---|---|---|
| 2003/0144793 | A1* | 7/2003 | Melaku | G01C 21/206 701/434 |
| 2013/0325653 | A1* | 12/2013 | Ouimet | G06Q 30/06 705/26.7 |
| 2014/0052562 | A1* | 2/2014 | Oliveira | G06Q 30/0643 705/26.5 |
| 2014/0244441 | A1* | 8/2014 | Maenpaa | G06Q 30/0601 705/26.62 |
| 2016/0092556 | A1* | 3/2016 | Cooper | G06F 16/319 707/748 |
| 2018/0033069 | A1* | 2/2018 | Hayne | G06Q 30/0631 |

* cited by examiner

*Primary Examiner* — William J Allen
(74) *Attorney, Agent, or Firm* — Kriegsman & Kriegsman

(57) ABSTRACT

A system for facilitating the creation, dissemination and fulfillment of supply lists includes a central controller that receives native supply lists from supply requestors. The controller uses intelligent matching to classify and translate individual items from each native supply list into an electronic supply list on a standardized platform, the electronic supply list including a UPC for each requested item as well as any personalized content. The electronic supply list is then rendered accessible not only to purchasers responsible for ordering the supplies but also retailers designated to sell the supply items. The use of UPCs allows for direct list fulfillment by a purchaser in communication with the central controller. Through a one-click initiation process, the purchasing party is redirected to the e-commerce site for the retailer, with the UPCs for the items in the electronic class list automatically extracted by the controller and loaded into a virtual shopping cart.

12 Claims, 13 Drawing Sheets

SYSTEM FOR FACILITATING THE ORDERING OF SUPPLIES USING A TRANSLATED NATIVE SUPPLY LIST

FIELD OF THE INVENTION

The present invention relates generally to the retail sale of school supplies, such as notebooks, pens and the like, and more particularly to the creation and fulfillment of school supply lists.

BACKGROUND OF THE INVENTION

Prior to or at the commencement of each academic year, public and private schools routinely send their students a shopping list of required and/or desired school supply items. As can be appreciated, back-to-school shopping is a burgeoning industry, with annual school supply sales figures currently in excess of $30 billion.

Traditionally, school supply lists are sent to parents either in print or electronic form. Each school supply list is often uniquely created by a faculty member and, as such, can vary from classroom to classroom. The list typically includes not only the specific supplies to be purchased but also original content that may reflect the individual teacher and community (e.g., reminders, tips and personal messages).

Electronic supply lists are typically compiled across different formats and data platforms. For instance, a school supply list may be created by a faculty member using a word processing program and, in turn, posted on a designated website or distributed directly to each student by email. Because the lists are created in multiple formats by multiple people, and distributed on paper and electronically through multiple channels and retail stores, the overall list creation and dissemination process has been found to be both time-consuming and inefficient in nature.

Once a list is received, the student is required to shop, either in-store or online, for the various items provided on the list. Often, a student is required to shop at multiple retail stores in order to fulfill the class list. Because students are afforded a limited timeframe prior to the commencement of the school year to purchase all requested supplies, the back-to-school shopping experience has been commonly found to be a stressful and frustrating experience.

Currently, there is no effective way to standardize the various types of school supply lists onto a common electronic data platform. As a consequence, electronic school supply lists generally remain largely inaccessible to local retailers, which results in a couple notable drawbacks.

As a first drawback, the inability to monitor local school supply lists precludes retailers from adequately preparing for the back-to-school shopping season. Instead, supplies are often inadequately stocked in certain locations due to mismanagement of the supply chain. In certain circumstances, the purchasing party is required to seek out multiple retailers to purchase a single item, which is highly inefficient.

As a second drawback, the inability to monitor local school supply lists precludes retailers from engaging in highly competitive pricing. In fact, discounted pricing is rarely afforded by retailers to the students of a particular classroom or school, even though the supplies are purchased amongst the group in large quantities.

SUMMARY OF THE INVENTION

It is an object of the present invention to provide a new and improved system for facilitating the ordering of supplies.

It is another object of the present invention to provide a supply ordering system that streamlines the process in which parties create and disseminate supply lists.

It is yet another object of the present invention to provide a supply ordering system of the type as described above that standardizes supply lists onto a common electronic platform.

It is still another object of the present invention to provide a supply ordering system of the type as described above that simplifies the list fulfillment process.

It is yet still another object of the present invention to provide a supply ordering system of the type as described above that renders electronic supply lists accessible to both supply purchasers as well as supply retailers.

It is even still another object of the present invention to provide a supply ordering system of the type as described above that is easily configurable and readily scalable.

Accordingly, as a feature of the present invention, there is provided a system for facilitating the ordering of supplies, the system comprising (a) a supply ordering facilitator, the supply ordering facilitator comprising a central controller, (b) a supply requestor, the supply requestor comprising a first compute device in electrical communication with the central controller, the supply requestor creating a native supply list with one or more items, the native supply list being received by the supply ordering facilitator, the central controller translating the native supply list into an electronic supply list on a standardized electronic platform, the electronic supply list being stored by the supply ordering facilitator, (c) a supply purchaser, the supply purchaser comprising a second compute device in electrical communication with the central controller, the supply purchaser retrieving the electronic supply list from the central controller using the second compute device, and (d) a retailer, the retailer comprising a server in electrical communication with each of the central controller and the second compute device, the server supporting an e-commerce shopping platform, (e) wherein the central controller is adapted to directly integrate the electronic supply list into a virtual shopping cart in the e-commerce shopping platform.

Various other features and advantages will appear from the description to follow. In the description, reference is made to the accompanying drawings which form a part thereof, and in which is shown by way of illustration, an embodiment for practicing the invention. The embodiment will be described in sufficient detail to enable those skilled in the art to practice the invention, and it is to be understood that other embodiments may be utilized and that structural changes may be made without departing from the scope of the invention. The following detailed description is therefore, not to be taken in a limiting sense, and the scope of the present invention is best defined by the appended claims.

BRIEF DESCRIPTION OF THE DRAWINGS

In the drawings wherein like reference numerals represent like parts:

FIG. 2 is an illustrative example that depicts the system shown in FIG. 1 translating a native school supply list into a standardized, one-click, school supply list;

FIGS. 3(a)-(d) are a series of sample screen displays of the front-end application utilized by a supply requestor in FIG. 1 to create a school supply list;

FIG. 5 is a sample screen display of data in an illustrative item registry table maintained by the supply ordering facilitator in FIG. 1.

DETAILED DESCRIPTION OF THE INVENTION

Supply Ordering System 11

Figure 1:
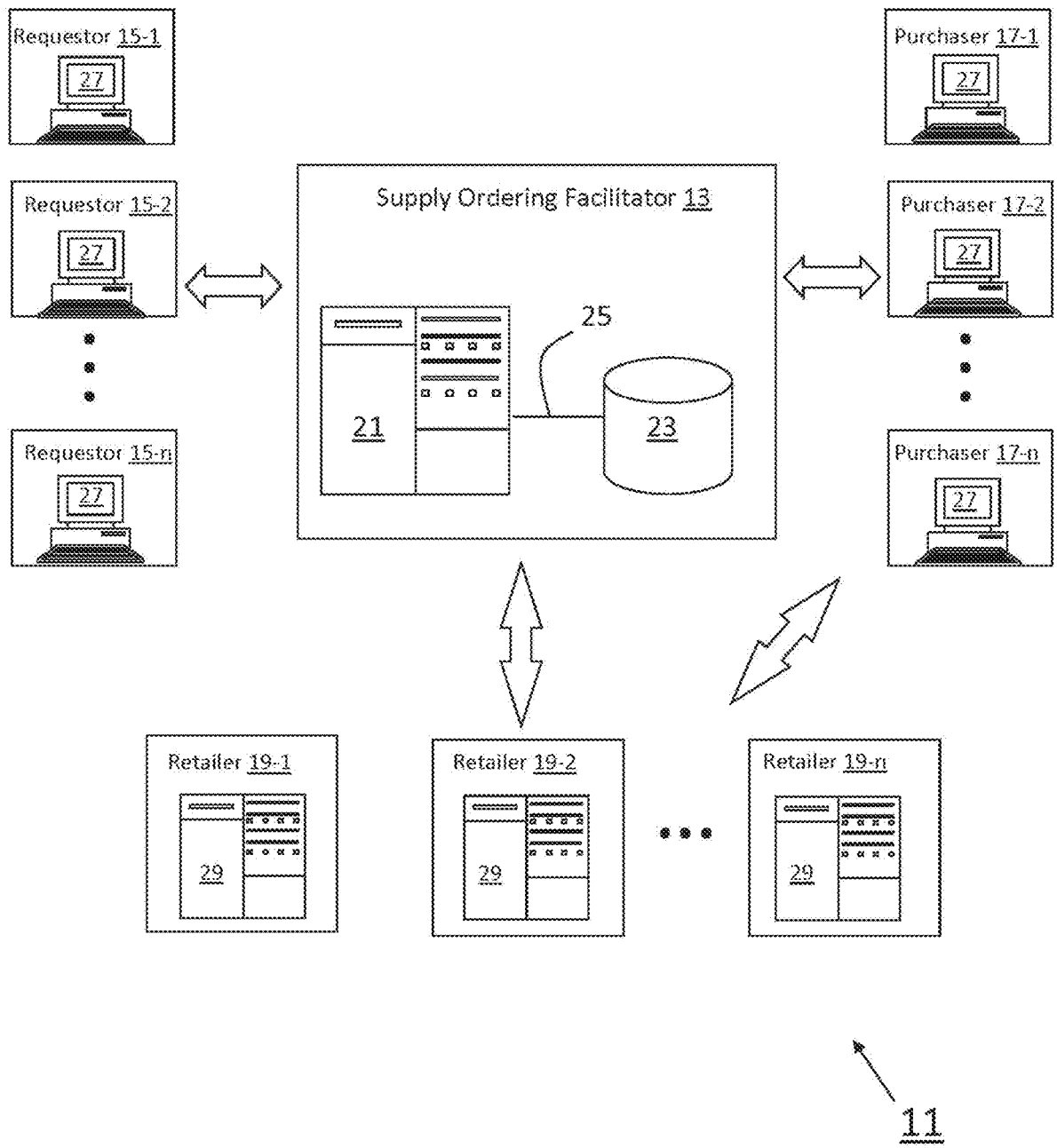
FIG. 1 is a block diagram of a system for facilitating the ordering of supplies, the system being designed according to the teachings of the present invention.

Referring now to FIG. 1, there is a shown a simplified block diagram of a system for facilitating the ordering of supplies, the system being designed according to the teachings of the present invention and being identified generally by reference numeral 11. As will be described further below, system 11 utilizes a web-based, aggregated solution to standardize unique supply lists onto a common electronic platform that, in turn, allows for list fulfillment through a simplified e-commerce shopping process.

As can be seen, system 11 comprises a supply ordering facilitator 13 which serves as the central hub between participants commonly involved in the creation and fulfillment of supply lists. Specifically, as represented herein, facilitator 13 is electronically linked with a plurality of supply requestors 15-1 thru 15-n, a plurality of purchasing parties, or purchasers, 17-1 thru 17-n, and a plurality of retailers 19-1 thru 19-n. Accordingly, as a principal feature of the present invention, facilitator 13 streamlines the manner in which (i) a requestor 15 generates and electronically disseminates a supply list to a designated set of purchasing parties 17 and (ii) each purchasing party 17 in receipt the supply list, in turn, orders requested list items electronically from a specified retailer 19.

In the description that follows, system 11 is explained in the context of the creation and fulfillment of school supply lists. In other words, each requestor 15 preferably represents any teacher or school administrator that has created a school supply list for a designated class, each purchasing party 17 preferably represents a student, or parent/guardian thereof, in the designated class, and retailer 19 preferably represents any online store that sells the items provided on the school supply list.

However, it should be noted that system 11 is not limited to the generation, transmission and fulfillment of school supply lists. Rather, it is to be understood that system 11 could be similarly applied to other environments that require the generation, transmission and fulfillment of supply lists, such as athletic teams, youth organizations, religious groups and the like.

Supply ordering facilitator 13 preferably includes a central controller 21 and a data storage device 23 in electronic communication with one another via network path 25. It is to be understood that controller 21 and device 23 may be either housed at a common facility or remotely connected.

As can be appreciated, central controller 21 serves as the functional hub of system 11. Preferably, central controller 21 is the form of a web server that allows for the exchange of data between the principal participants of system 11 through one or more designated web pages. In use, controller 21 is designed to receive and translate school lists created by requestors 15 into a standardized electronic platform that is accessible to designated purchasing parties 17. In turn, controller 21 is designed to interface with at least one e-commerce retailer 19 and allow for the standardized list data to be integrated into the retailer e-commerce shopping platform and therefore enable ordering of listed items through a simplified, one-click shopping process, as will be explained further in detail below.

Storage device, or database, 23 stores the various types of data associated with the supply ordering process including, but not limited to, a hierarchal registry of items that are to be included on class lists. As a feature of the present invention, class list information stored in database 23 can be modified in real-time to reflect purchases made in connection with group-wide wish lists and thereby prevent redundant supply ordering.

To communicate with central controller 21, each purchasing party 17 and supply requestor 15 is shown provided with a web-enabled compute device 27, such as a desktop computer, mobile device or the like. Further, since each retailer 19 functions as an online store for purchasing supply items, retailer 19 is preferably provided with an e-commerce server 29 with a designated application that facilitates the ordering of school supplies.

System 11 is shown herein as comprising multiple retailers 19. In this manner, consumers can more effectively shop with retailers 19 via supply ordering facilitator 13 and therefore obtain the most favorable price offerings.

Overview of Supply Ordering Process

As referenced briefly above, web server 21 is programmed with an application programming interface (API) that utilizes intelligent matching to classify and translate individual list line items directly from each supply list into standardized supply list taxonomy. Further, each item in the standardized list is provided with at least one Universal Product Code (UPC) link, which allows for direct item fulfillment from a retailer 19 through a simple, one-click ordering and shopping cart-type payment process.

Figure 2:
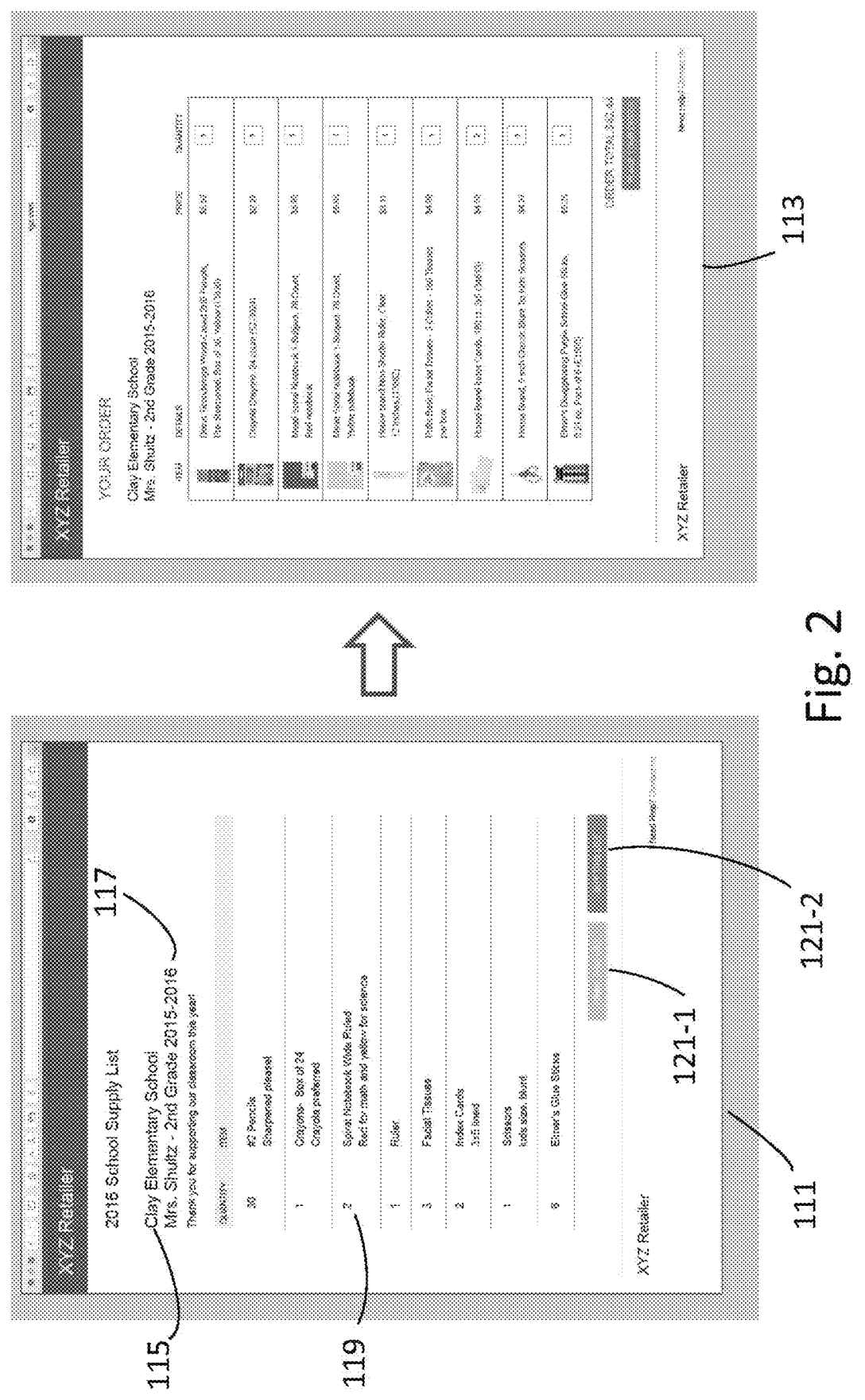

In FIG. 2, there is shown a native, or natural, list 111 created by a requestor 15 (e.g., through a designated site hosted by webserver 21) that is, in turn, translated into a one-click, or standardized, list 113 on the e-commerce platform hosted by retailer server 29, thereby enabling a purchaser 17 to easily complete the ordering process. The ability to convert a native supply list (e.g. list 111) into a translated, or one-click, list (e.g. list 113) is achieved largely through the creation, storage and continuous updating of an items registry table in database 23, as will be explained further below. In this manner, products can not only be easily categorized and grouped but also directly associated with one or more Universal Product Codes (UPCs) that can be used to fill an e-commerce shopping cart.

As seen in FIG. 2, native list 111 provides list data for display and ordering functionality. In particular, native list 111 enables teachers to create an electronic supply list that incorporates general and/or specific items for purchase as well as certain personalized content, as deemed necessary. Native list 111 includes, among other things, (i) list identification data 115, such as a school name, zip code or other identifier, (ii) list header data 117, such as a teacher/class name and/or personalized message, and (iii) list content data 119, such as the particular item(s) to be purchased, with the ability to notate the exact quantity, brand or model of product, if desired.

By comparison, translated list 113 is represented in shopping cart form within the e-commerce platform for retailer 19 by directly mapping the translated list data into a set of corresponding UPC links. As part of the item translation process, facilitator 13 segments each line item in native list 111 into one of the following six data types: (i) direct/clear UPC matches, wherein a supply requestor 15 identifies a specific item for purchase, which allows for the direct identification of its associated UPC (e.g., one Kleenex® brand, 65 count box of white facial tissues), (ii) broad UPC matches, wherein non-specific, non-branded requests are translated into as many as three active UPC links that match the request (e.g. glue stick is translated into as many as three products that fit the description, including a 4-pack of 0.024 ounce, Elmer's® brand, glue sticks), (iii) parent/child matches, wherein if a teacher gives a parent request (e.g. a Mead® brand, wide ruled, spiral notebook) with multiple child options (e.g., available in red, blue and yellow), the system provides all or selected UPC links to the multiple child options, (iv) optional/qualifying matches, wherein a teacher may assign different items to different students (e.g. boys requested to order a first item and girls requested to order a second item), (v) non-orderable items for products not sold by retailer 29 (e.g., an old dress shirt for use as a smock or a town library card), which are preferably coded as custom items that are added largely as text, in some cases with phantom UPCs, and (vi) personalized notes for any/all informational comments or messages (e.g., please purchase by a certain date).

Native list 111 additionally includes a pair of functionality buttons 121 for performing specific tasks. Specifically, a print button 121-1 allows for the supply list to be printed, for example, if the purchasing party 17 would prefer to order products through a conventional brick-and-mortar store. Additionally, a single "buy" button 121-2 translates each item in the class list with a preferred, or optimized, UPC link that mapped into the retailer e-commerce platform. In this manner, through activation of button 121-2, the user is able to load every item provided on native list 111, in the specified quantity, into a virtual shopping cart, thereby transforming the entire school supply purchasing process into a single, one-click shopping experience, which is highly desirable.

Detailed Example of the Creation and Fulfillment of School Supply Lists

As noted above, supply ordering system 11 simplifies the manner in which school supply lists are created and fulfilled. Specifically, system 11 relies on a three-step process to facilitate back-to-school supply ordering: (i) the creation of native supply lists by supply requestors 15 (e.g. through a designated website hosted by web server 21), (ii) the continuous back-end maintenance of an item registry table by facilitator 13 to categorize and hierarchically associate common school supply items, described at various levels of specificity, with one or more Universal Product Codes (UPCs), and (iii) the fulfillment of a native supply list by a purchasing party 17 by translating the native supply list data into a corresponding set of UPCs which, in turn, are directly mapped onto an e-commerce website hosted by retailer 19 to create a translated, or virtual shopping cart-type supply list that is ready for checkout.

To assist in the understanding of how the list creation process operates, a series of sample screen displays are shown herein in FIGS. 3(a)-(d). It is to be understood that the sample screen displays are provided for illustrative purposes only and, as such, are not to be viewed in a limiting sense.

Figure 3A:
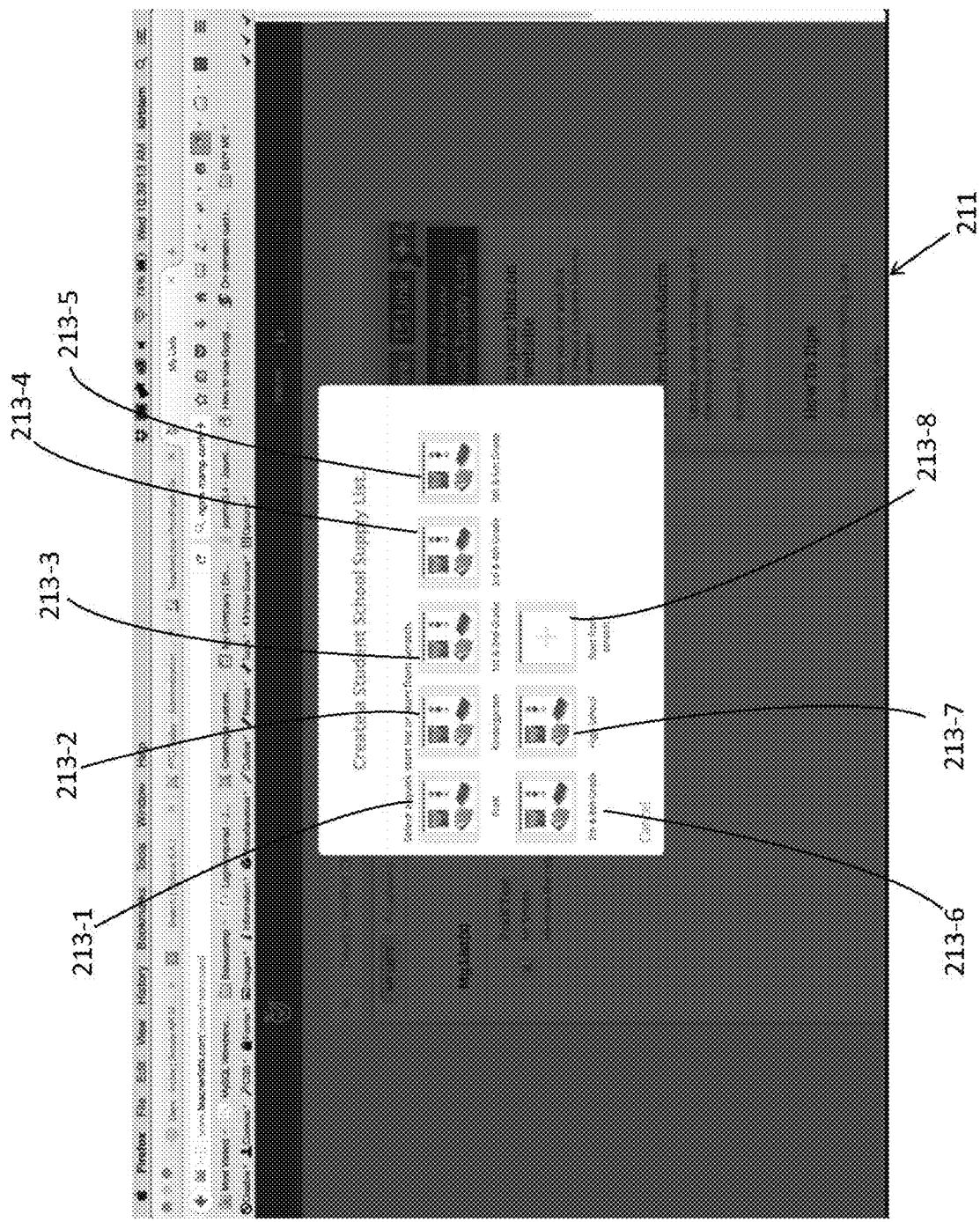

Referring now to FIG. 3(a) there is shown a sample screen display 211 which illustrates how a supply requestor 15 (e.g., a teacher, parent or school supply administrator) creates a class list through a designated front-end list creation application hosted on web server 21. As can be seen, screen display 211 includes a variety of pre-fill buttons 213-1 thru 213-7 that are preloaded with a set of school supply items commonly required for particular grade levels, which in turn can be edited by requestor 15, as needed. If a requestor 15 prefers creating a list from scratch, screen display 211 additionally includes an extra button 213-8 for generating a list with no preloaded items.

Figure 3B:
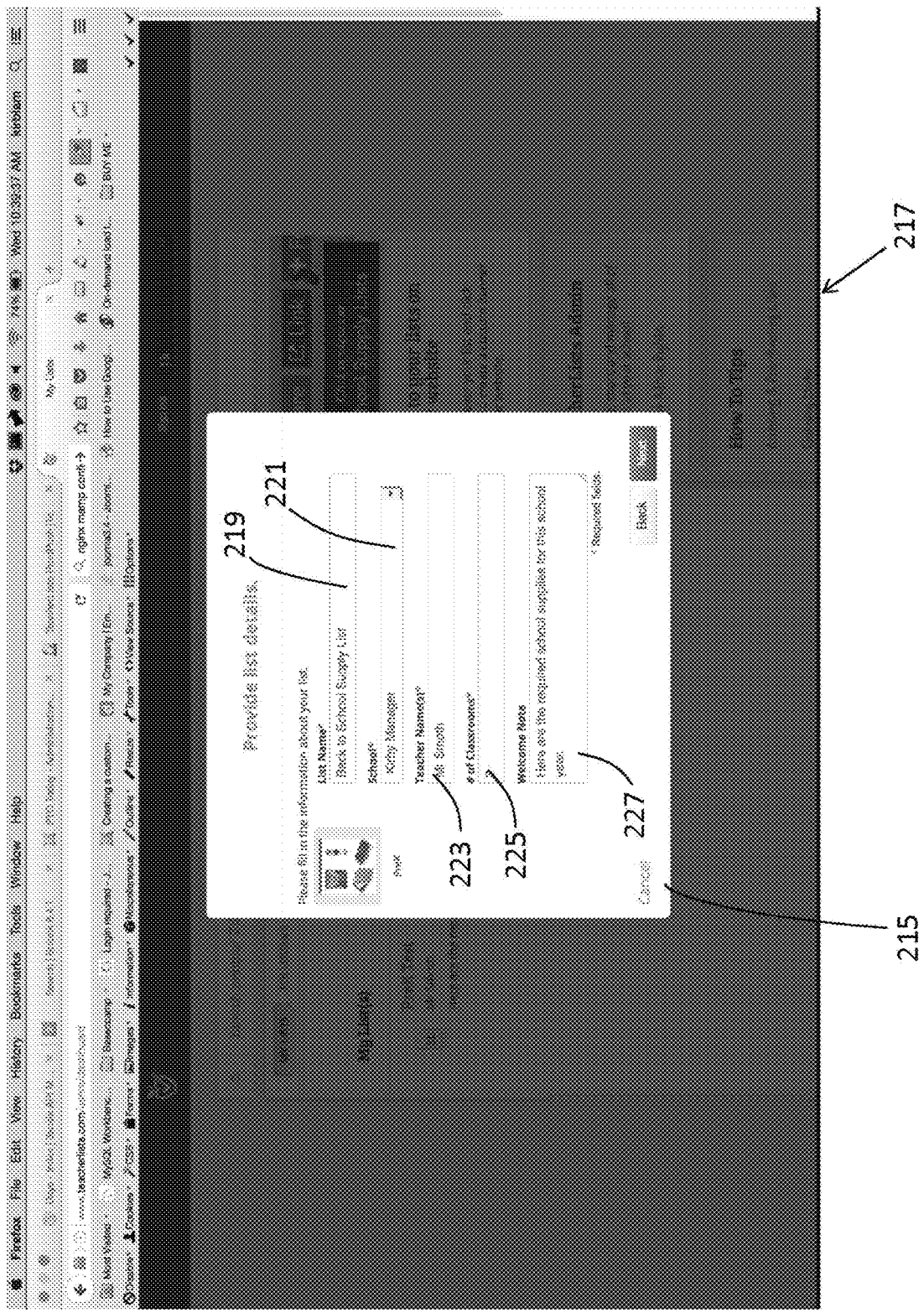

Upon selecting one of buttons 213, the user is provided with a list detail window 215, as depicted in sample screen display 217 shown in FIG. 3(b). List detail window 215 enables the supply requestor 15 to associate basic information with the list that includes (i) a list name window 219 (e.g. Back to School Supply List), (ii) a school name dropdown window 221, (iii) a teacher name window 223, (iv) a classroom number window 225, and (v) a message window 227 to enable a personal welcome note to be displayed with the list.

Figure 3C:
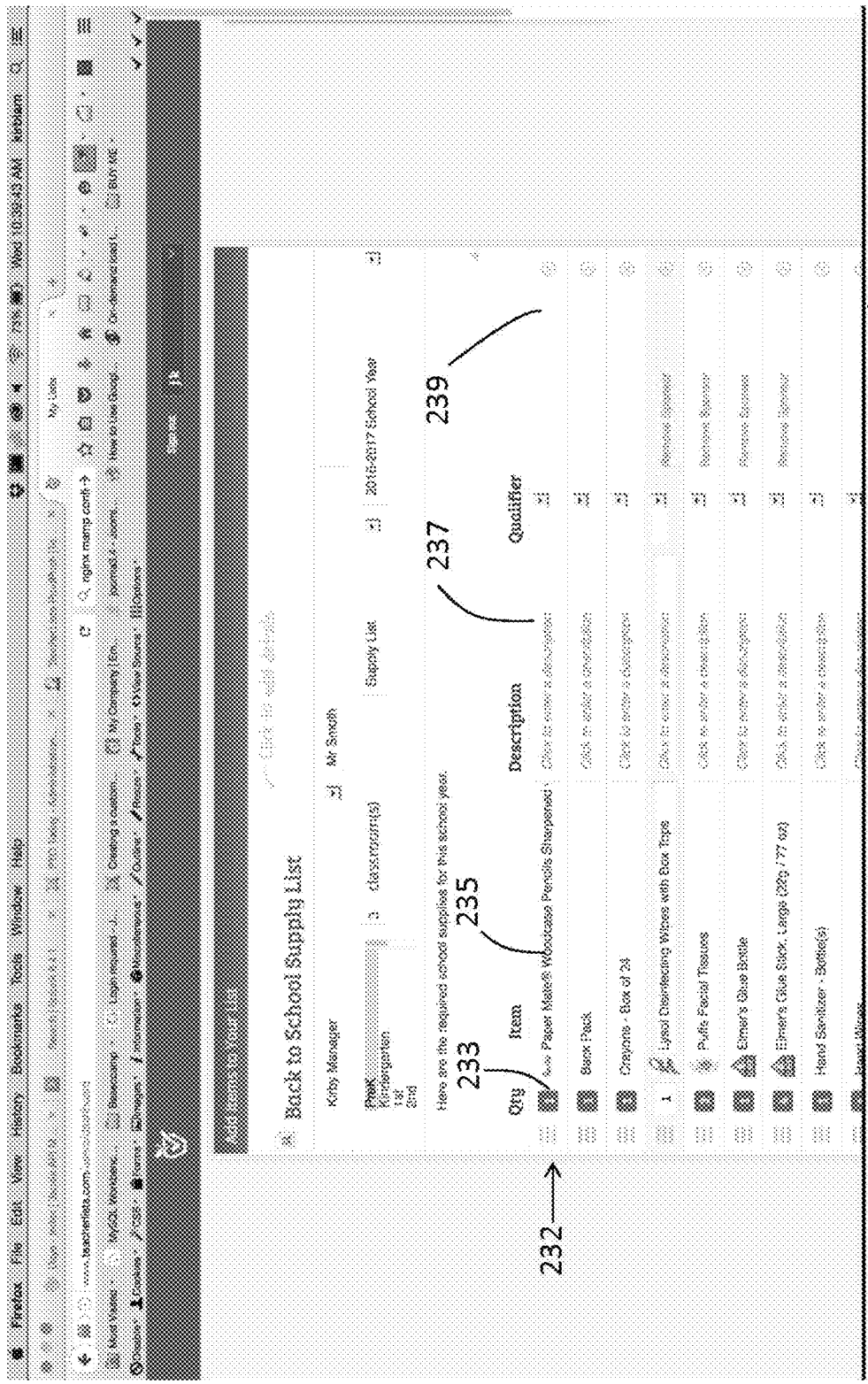

Once completed, the list creator 15 is provided with a native list of items that is dependent upon which button 213 is selected, as represented in screen display 231 shown in FIG. 3(c). In the native list display 231, the basic list information, which was previously entered via window 215, is displayed along with the specific items to be included on the list.

As can be seen, each list item is represented as a designated row 232 that includes (a) an item quantity window 233, (b) an item type window 235 which identifies the product requested, (c) a description window 237 which allows for an optional note to be included with the item request (e.g., please mark item with student name), and (d) a qualifier window 239 for restricting purchase of the item to a defined segment of the class (e.g. students with last name beginning with A-L).

Figure 3D:
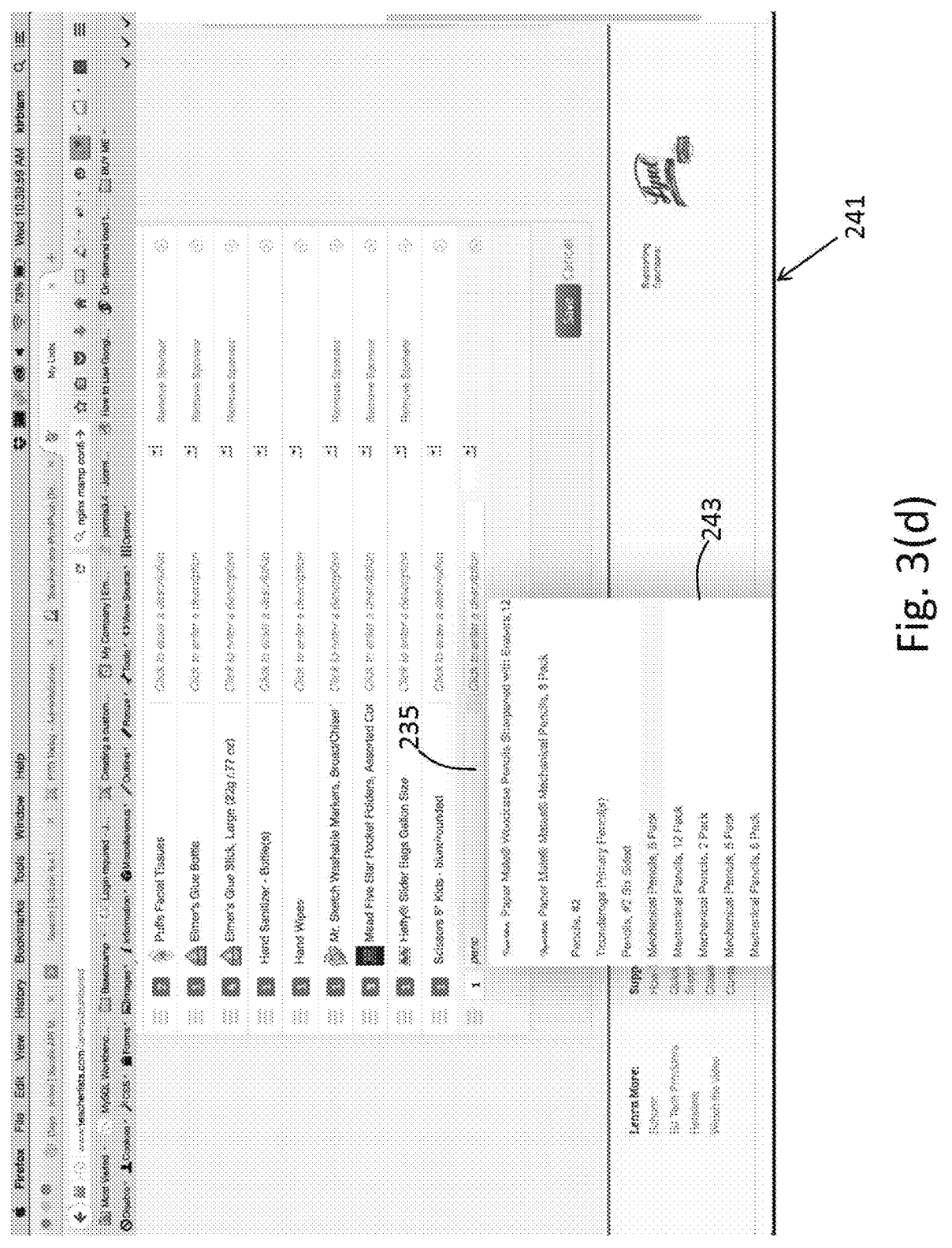

As seen in screen display 241 shown in FIG. 3(d), item window 235 accesses the items registry table in database 23 when activated to assist in the product entry process. Preferably, the front-end application utilizes an autocomplete technique to rapidly search and algorithmically match the term input into window 235 with items already listed in the items registry table. As a result, the item provided in the native list can converted into one or more UPCs, when needed.

For instance, typing of the term "penc" causes the autocomplete indexing technology to extract pencil-based items from the items registry table and, in turn, display such items in a dropdown window 243. It should be noted that all items that fall within the scope of the term in the items registry table are provided in dropdown window 243. As a result, both brand-specific products as well as general categorical terms may be listed in the same dropdown window 243. Preferably, preferred sponsors identified from the table are listed within window 243 at a primary location along with any image path info (e.g. a logo and/or stylized lettering) to increase brand awareness and promote purchase.

As an exception/alternative to the list generation process set forth in detail above, the user is able to upload a supply list file created in a designated format (e.g. PDF, DOC or XLS file) which is then manually entered into the front-end screen display provided by web server 21 by data entry personnel at supply ordering facilitator 13.

Once the list generation process is completed, the purchasing party 17 is able to initiate a supply list fulfillment process which converts the native list into a set of UPC codes. In turn, the set of UPC codes is retrieved by retailer 19 from facilitator 13 into the retailer e-commerce application in order to seamlessly convert the original list into a translated, one-click, virtual shopping cart of items.

As noted above, the translation of a native shopping list into a UPC-based, one-click, virtual shopping cart is achieved through the continual, back-end maintenance of an item registry table, as well as some additional data, by facilitator 13. As can be appreciated, the item registry table allows for, inter alia, the categorization and hierarchical association of common school supply items, described at various levels of specificity, with one or more Universal Product Codes (UPCs).

To help understand how the back-end maintenance of the item registry table, as well as some related data stored in database 23, is accomplished, a series of sample screen displays are shown herein in FIGS. 4(a)-(f). It is to be understood that the sample screen displays are provided for illustrative purposes only and, as such, are not to be viewed in a limiting sense.

Figure 4A:
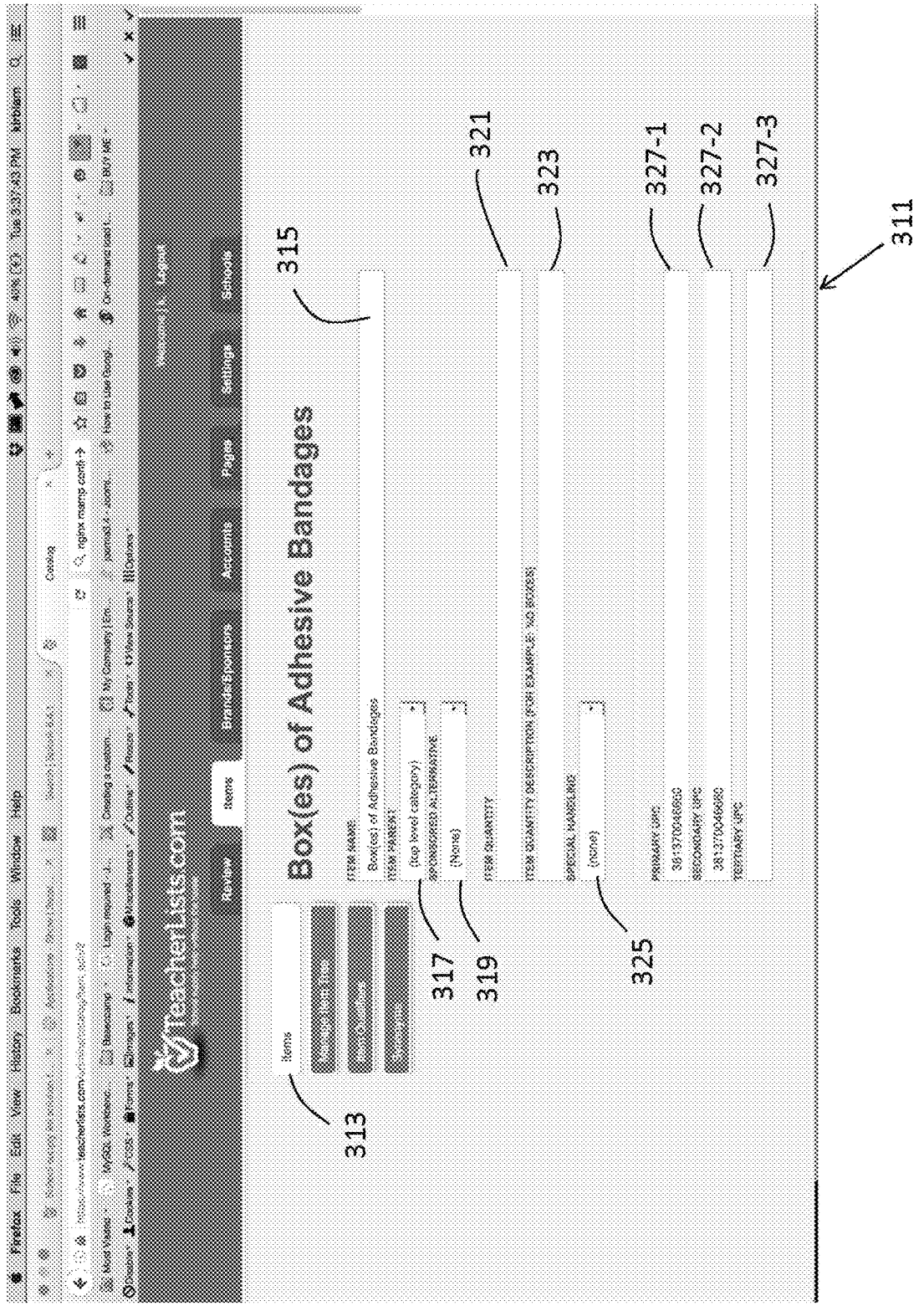
FIGS. 4(a)-(f) are a series of sample screen displays of the back-end application utilized by the facilitator in FIG. 1 to maintain the item registry table and other related data stored in the database.

Preferably, the items registry table, and all the item trees contained therein, is created and maintained by supply ordering facilitator 13 through a designated application. Referring now to FIG. 4(a), there is shown a sample screen display 311 of the application which is designed for use by administrative personnel at facilitator 13 in order to, among other things, add and maintain the various items to be included in the items registry table.

As can be seen, the items registry maintenance application includes an items tab 313, which allows for the creation and management of an item tree in the registry table. Specifically, an item name window 315 is provided which provides a user-intuitive identification of the item (e.g. box(es) of adhesive bandages). An item parent window 317 is provided immediately beneath window 315, window 317 enabling the item to be categorized within a predefined top level category (i.e., the broader category that defines the top-level of each item tree). If no item parent is elected, the item name serves as the top level for its associated item tree.

A sponsored alternative window 319 is also provided in order to designate a selection of sponsored products within the item tree. As noted previously, sponsored products are preferably displayed in a prominent, conspicuous fashion to increase brand awareness and promote purchase.

Additional information that can be associated with an item includes (i) an item quantity window 321 for denoting the specific quantity of the item in the particular package (e.g., one package of 5 bandages), (ii) an item quantity description window 323 for specifying any other quantity information with the item (e.g., the 5 bandages are all of varying sizes), and (iii) a special handling window 325 for designating specific handling instructions for the product.

Together, windows 321 and 323 provide the items registry maintenance application with means for resolving ambiguities relating to item quantities. In other words, if a particular item in the item registry is provided with a UPC link that represents a bundled package (i.e. more than 1 of the item), a list request for a particular quantity of the items needs to be resolved in relation to the package in order to prevent inadvertent overspending.

For instance, a particular brand of mechanical pencil may be commonly sold as a package of five, the UPC for which may be associated with the item in the registry table. If a supply list requests the purchase of two pencils of the aforementioned brand, a single package of five pencils would clearly fulfill the list request. However, if the number of pencils in each package is not specified, purchasing party 17 may unknowingly purchase two packages of five pencils, which would result in unnecessary overspending. Accordingly, any ambiguities with respect to item quantities in relation to packaged quantities are resolved on the backend by supply ordering facilitator 13, when necessary, by identifying in windows 321 and 323 how many items are contained within a particular package.

As seen in FIG. 4(a), UPC windows 327-1, 327-2 and 327-3 receive the numeric UPC strings for the specific products to be associated with the item name. Preferably, the entered UPC strings are ranked in order of preference, with window 327-1 representing the primary UPC, window 327-2 representing the secondary UPC and window 327-3 representing the tertiary UPC. As represented in FIG. 4(a), less than three UPC strings can be entered, if it is desired that the corresponding item registry tree be designed as such.

Although not shown herein, it is to be understood that central controller 21 is preferably provided with an application programming interface (API) that enables a retailer 19 to access and modify the UPC preferences established by facilitator 13. In this manner, specific products (e.g., retail brands) can be prioritized for purchase.

Figure 4B:
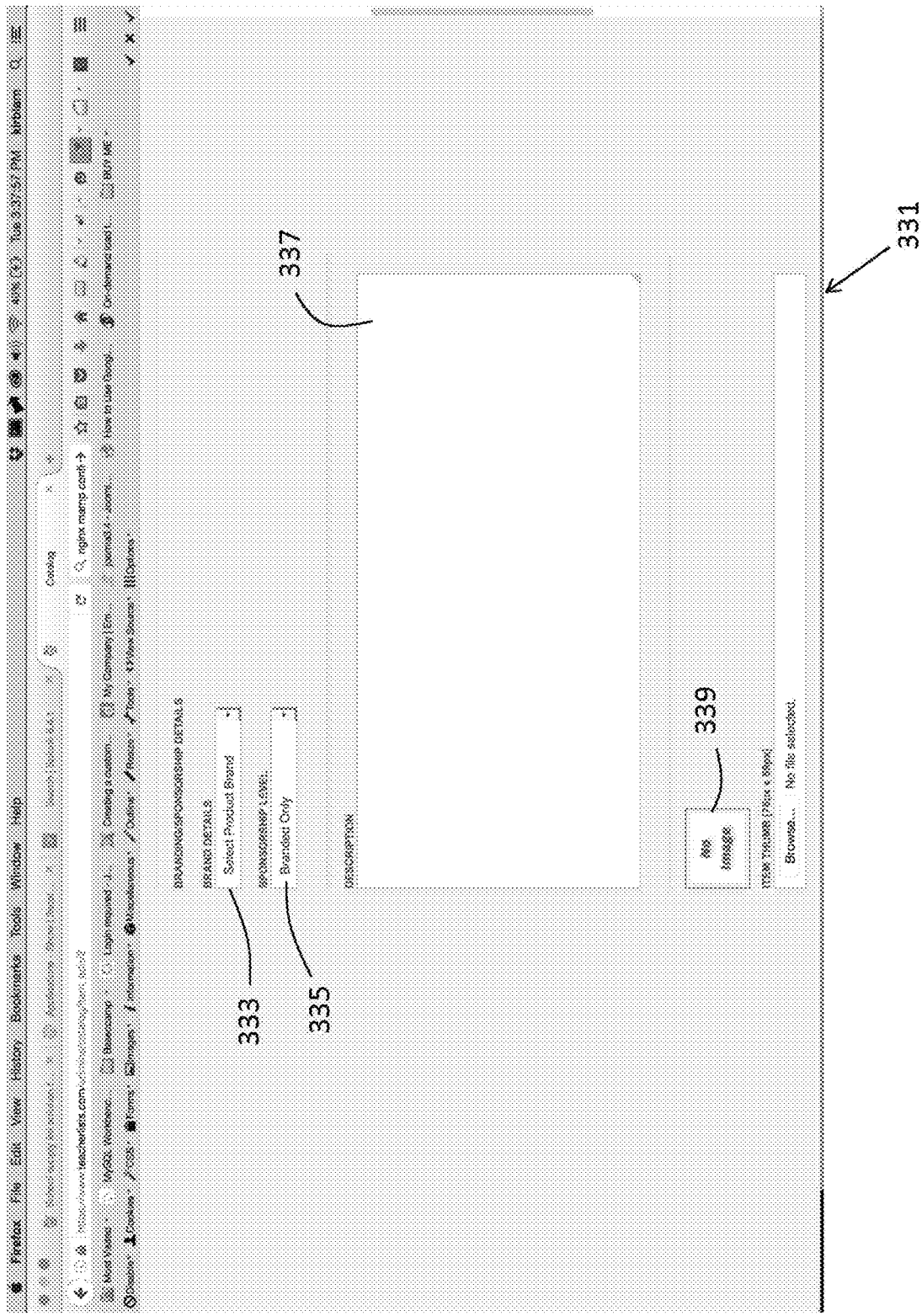

As represented in screen display 331 shown in FIG. 4(b), the items registry maintenance application further includes means for associating a particular brand with the item (i.e. Ticonderoga® brand, no. 2 pencils). Specifically, the application includes a brand details dropdown box 333 for selecting a particular brand of product, a sponsorship level dropdown box 335 for identifying the sponsorship level of the brand identified in window 333 (e.g., a premium sponsor entitled to certain defined privileges), a description window 337 for enabling any additional information relating to the product to be associated therewith, and an image thumbnail window 339 that allows for a picture to be associated with the product to facilitate and promote purchase (e.g. in connection with certain sponsorship levels).

Figure 4C:
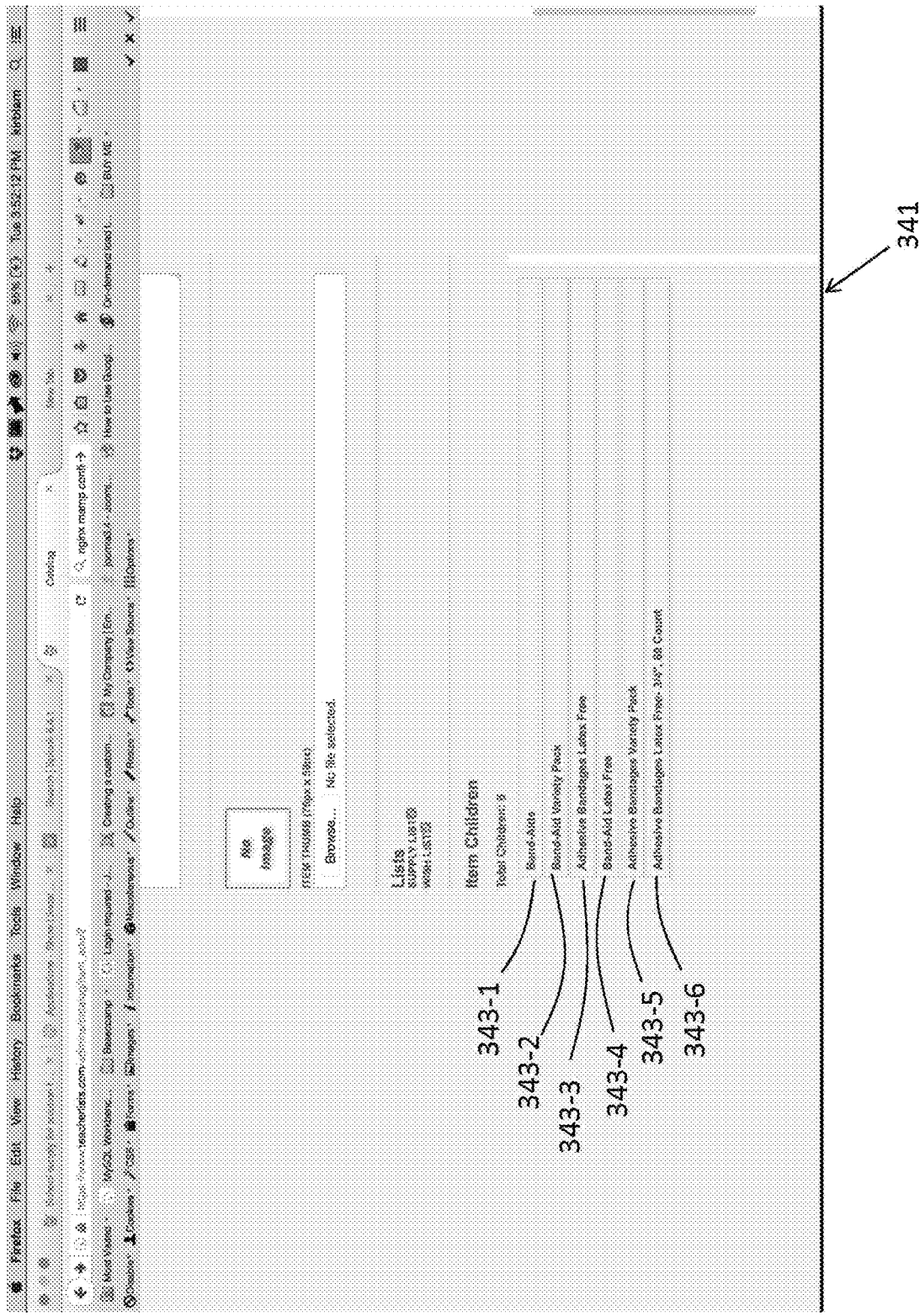

Lastly, as represented in screen display 341 shown in FIG. 4(c), each parent item entry lists the various children items 343-1 thru 343-6 associated therewith. In this manner, the item tree is effectively configured.

It should be noted that when a specific brand is associated with a product, the application is designed to display the brand request which, in turn, purchasing party 17 should recognize and comply in accordance therewith. In other words, because supply requester 15 has specifically identified a particular brand of product, purchasing party 17 is required to adhere to the brand request at the time of purchase. By contrast, products listed in generic fashion allow greater freedom to purchasing party 17 in selecting a particular brand.

Figure 4D:
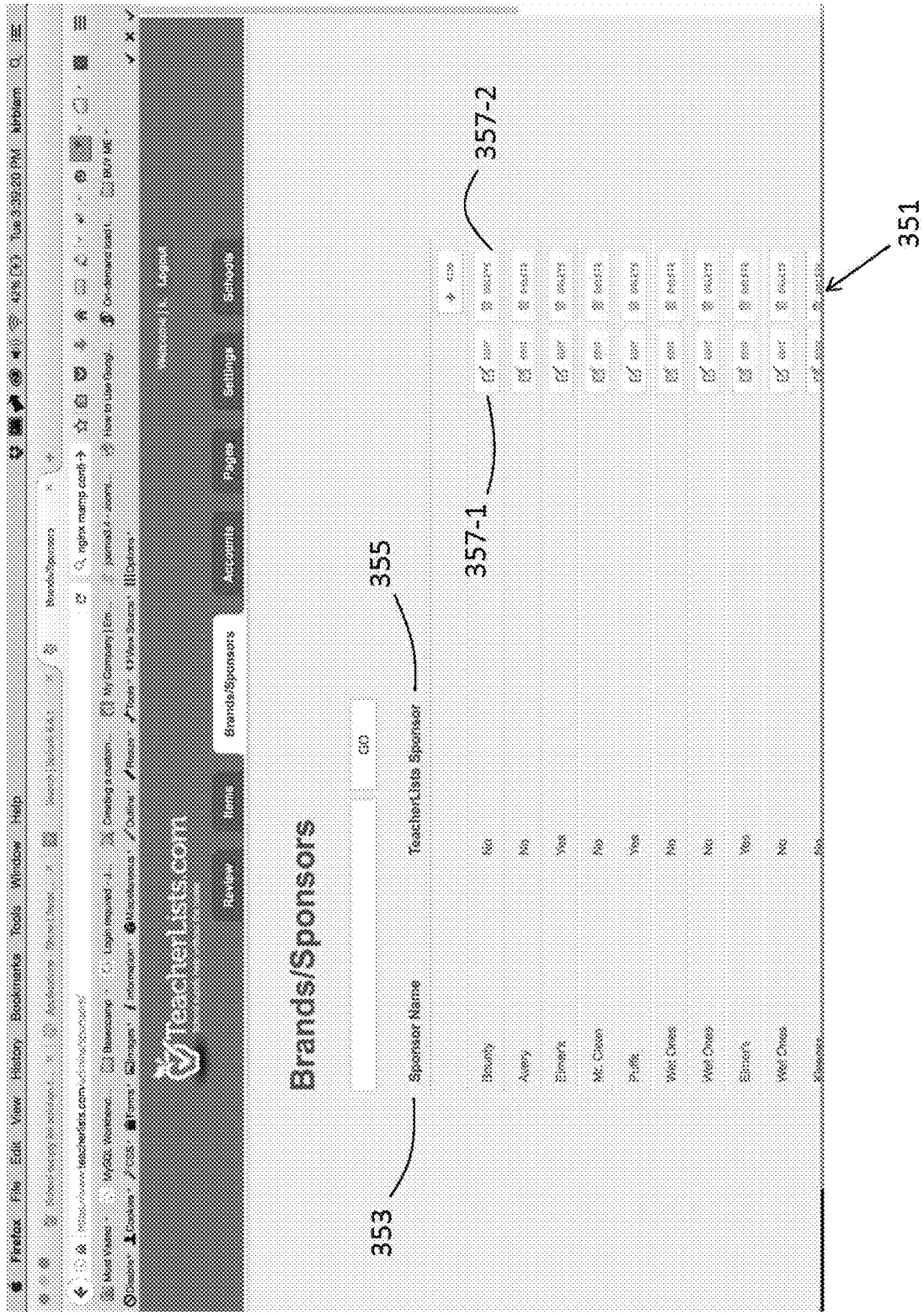
Figure 4E:
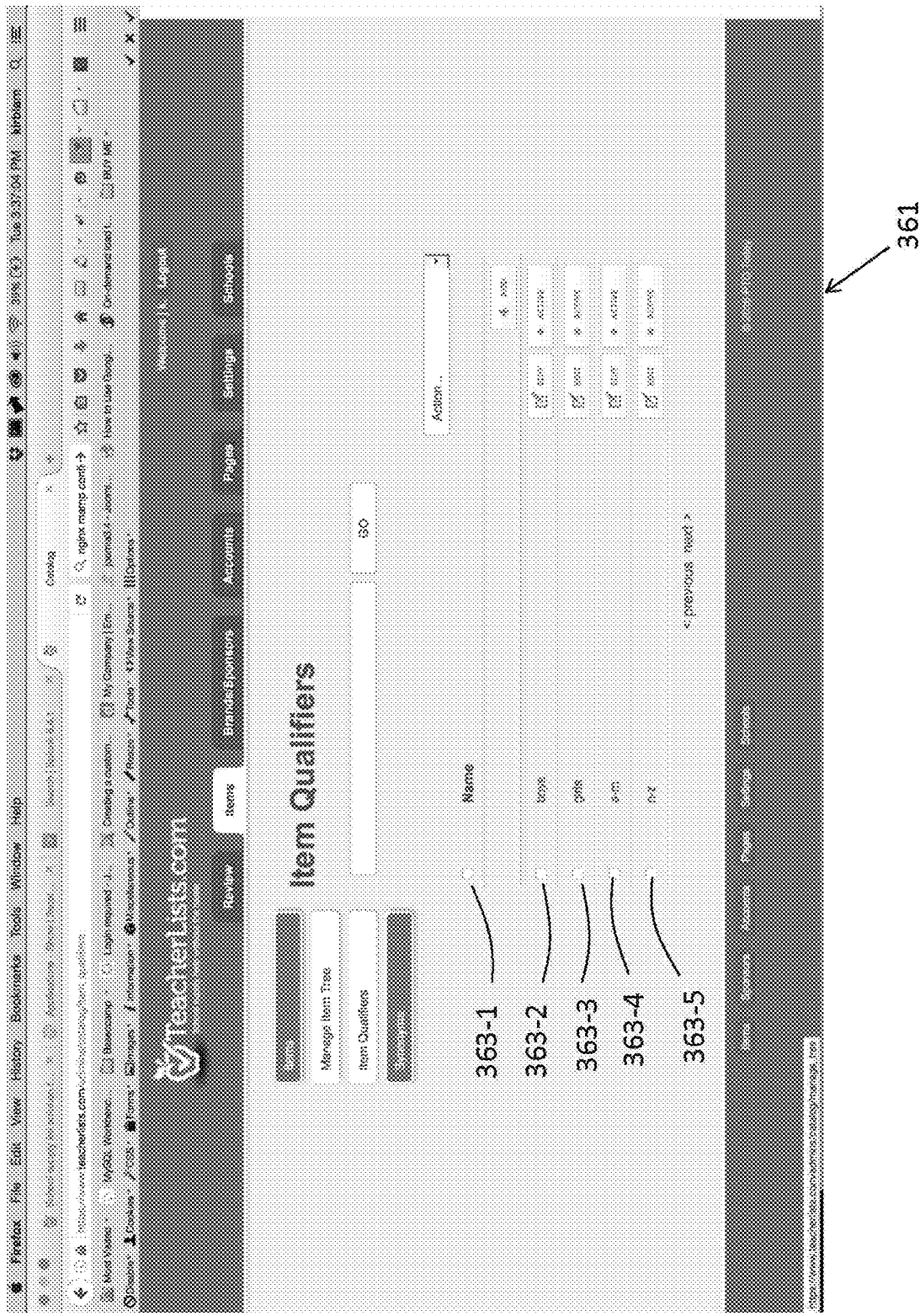
Figure 4F:
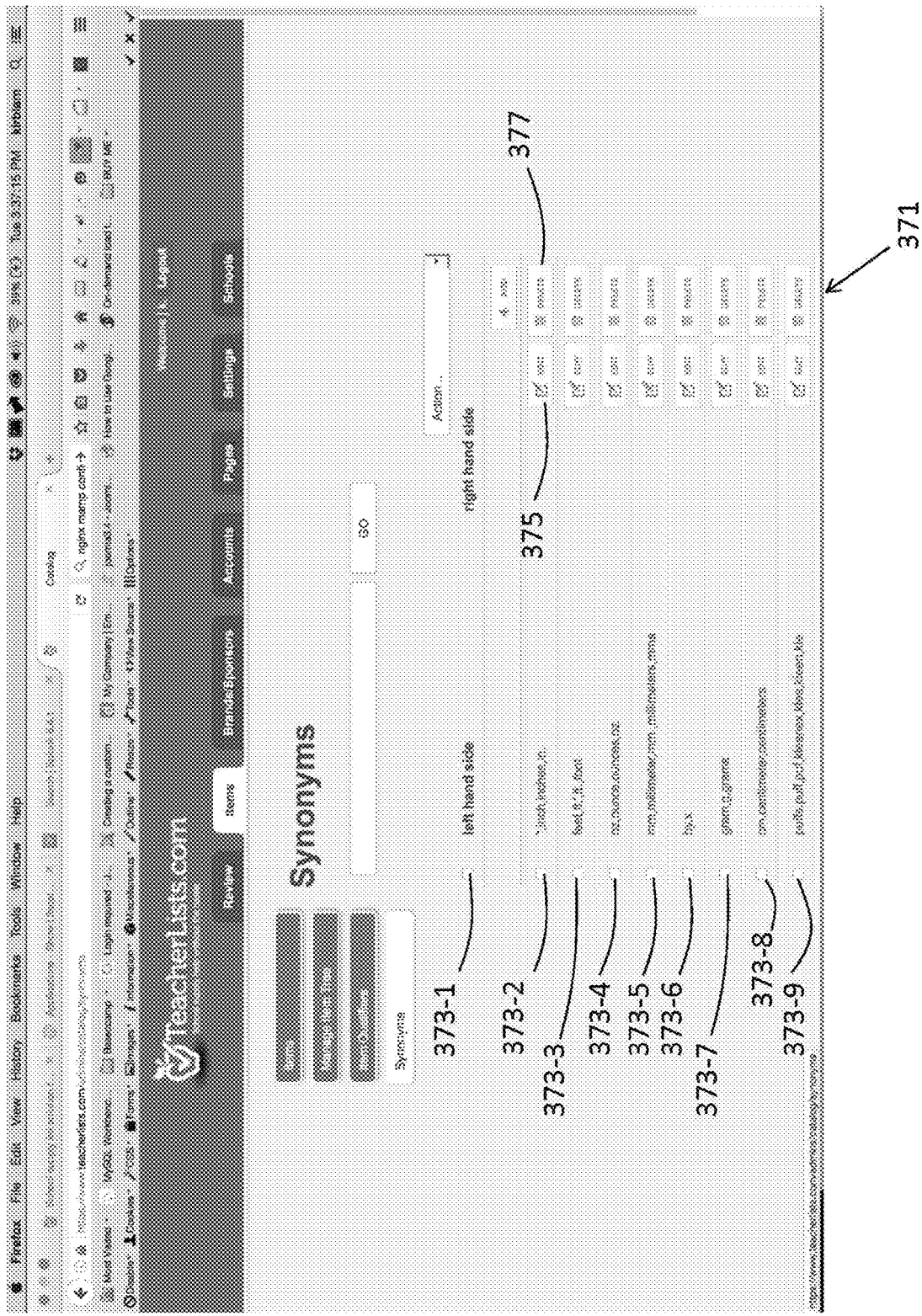

Referring now to FIG. 4(d), there is shown a sample back-end screen display 351 that lists all the product brands available within the items registry. As can be seen, each brand is listed by name 353. Additionally, a sponsor column 355 is provided that denotes whether each brand is a paid sponsor of supply ordering system 11 and thereby entitled to preferred display for purchase, as referenced above. Lastly, edit and delete buttons 357-1 and 357-2 are available to allow for modification and deletion, respectively, of information associated with each brand name.

The item registry maintenance set forth in detail above facilitates the process of locating an item from database 23 and, in turn, extracting one or more corresponding UPCs. In addition to the creation and maintenance of the various item trees, the back-end application permits modification of further features that assist in the list generation process.

As an example, when an item is included on a class list, qualifiers can be associated with the item to restrict purchase of the item to a particular segment of the class. As depicted in sample screen display 361 shown in FIG. 4(e), qualifiers can be established by facilitator 13 for use by a list requestor 15 to restrict purchase of an item on a class list to a specific set of individuals by, among other things, full name 363-1, by sex 363-2 and 363-3, or alphabetical groupings 363-4 and 363-5. Further, it should be noted that the use of qualifiers in combination with real-time adjustments to the status of certain items on class wish lists can prevent redundant purchasing of supplies, which is a notable advantage of the present invention.

As another example, synonyms can be associated with item terms in the items registry table to facilitate the auto-completion process and thereby facilitate conversion of a native class list into a standardized class list. As shown in sample screen display 371 shown in FIG. 4(f), synonymous item terms can be linked, or paired, together to facilitate the searching process.

In the present example, synonyms are provided on display 371 as a series of synonymous term groupings 373-1 thru 373-9, each grouping 373 including an edit button 375 for modifying the terms included in the synonymous grouping and a delete button 377 for deleting the entire grouping from the synonym list. As can be seen on screen display 371, the terms "centimeter," "cm," and "cms" are stored in database 23 as synonyms so that a list creator (e.g. supply requester 15) can readily locate a particular item in the registry table (e.g. a centimeter ruler) regardless of the synonymous term utilized.

Through the above-described, back-end maintenance of data, broader categorical terms (e.g. pencils or synonyms thereof) can be effectively translated into a set of more specific products (e.g. particular numbers and brands of pencils) and, in turn, into a set of corresponding Universal Product Codes.

Figure 5:
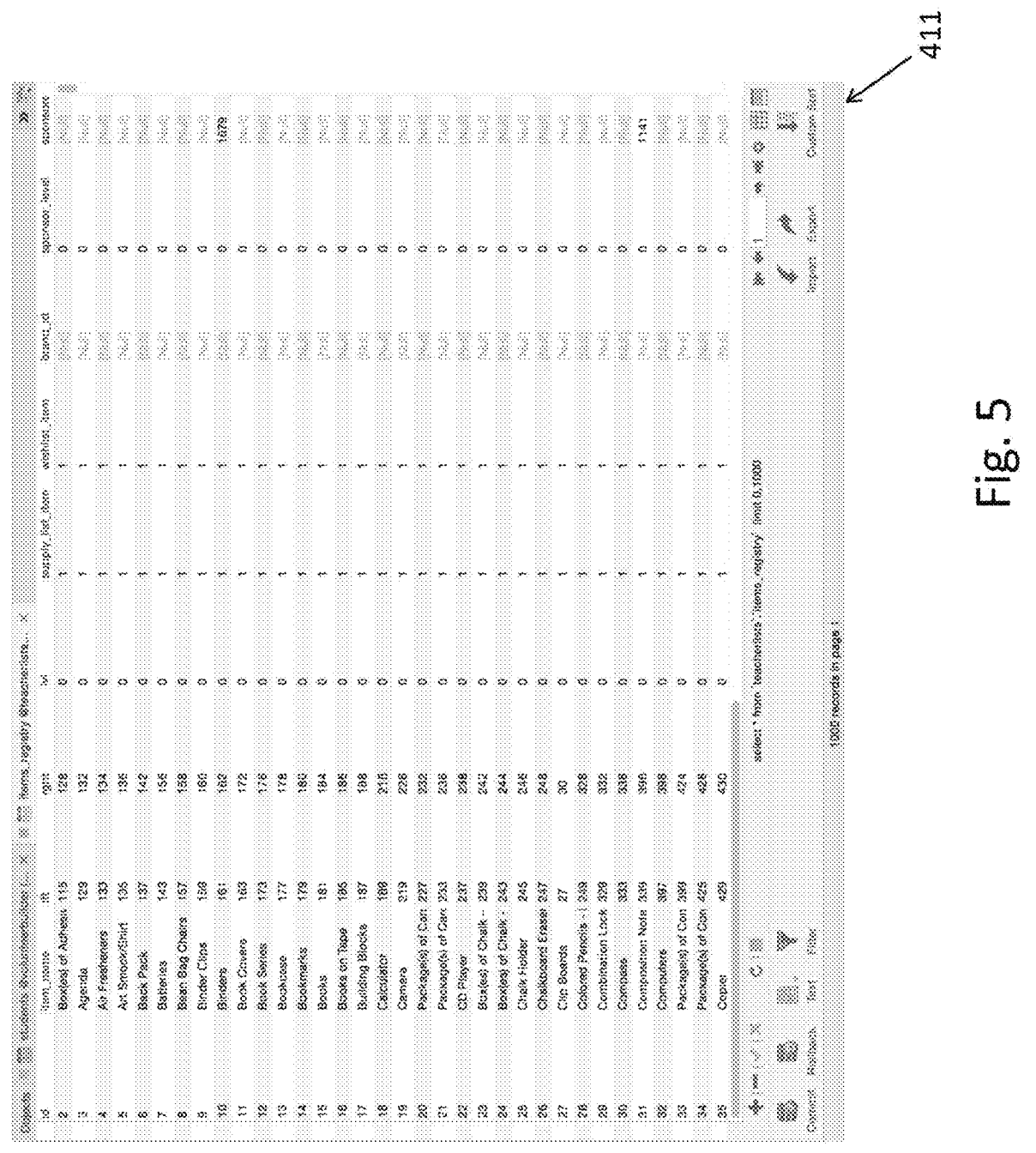

To help organize the items registry table, the data contained therein is preferably stored in database 23 using a nested set model, which defines both parent-child relationships (e.g. Mead® brand notebook—red, blue and green Mead® brand notebooks) as well as a hierarchical column framework. A screen display of data in a sample items registry is represented generally as reference numeral 411 in FIG. 5.

Upon completion of (i) the creation of native supply lists by requestors 15 and (ii) the back-end maintenance of the item registry table by facilitator 13, a purchasing party can fulfill a supply list request by accessing the class list via facilitator web server 21, retailer web server 29 or a designated school website. To facilitate access, a link to the list may be electronically delivered to purchasing party 17 by email, social media or other suitable means.

By clicking on buy button 121-1 on the native list, purchasing party 17 is directed to the e-commerce site for retailer 29 and the UPCs for the items in the class list are automatically extracted from database 23 and loaded into a virtual shopping cart. In this manner, purchasing party 17 can then fulfill the supply request by simply engaging in a standard electronic financial transaction.

Select Features and Advantages of the Present Invention

Supply ordering system 11, as set forth in detail above, yields a number of notable advantages over traditional school supply list creation and fulfillment methods.

As a first advantage, system 11 allows for the creation of a class list, including any personalized messages, in a native, or free-form, style (i.e. without any restrictions relating to terminology, format or the like). For instance, the creator can define the level of specificity of the item requested using either a broad categorization or a brand-specific identification. Further, the created list can be readily disseminated to the class through a designated website hosted by facilitator 13. In this manner, the list is essentially ubiquitous, since it is continuously available through server 21 using any conventional, web-enabled compute device.

As a second advantage, system 11 allows for ease of list fulfillment by converting each requested item on a class list into a corresponding UPC that is directly loaded into the shopping cart of the e-commerce platform for designated retailer 29. Accordingly, supply ordering can be achieved by purchasing party 17, if desired, through a simplified, one-click, electronic shopping experience. As detailed above, the hierarchal arrangement, or mapping, of data in the items registry table along with the autocomplete feature in the list creation API is essential in assigning one or more UPCs to each item in the native list, regardless of the level of item specificity provided.

As a third advantage, the ability of retailers to monitor class lists in real time not only allows for greater supply management but also effective marketing and pricing, which are principal objects of the present invention.

The embodiment shown above is intended to be merely exemplary and those skilled in the art shall be able to make numerous variations and modifications to it without departing from the spirit of the present invention. All such variations and modifications are intended to be within the scope of the present invention as defined in the appended claims.

What is claimed is:

1. A system for facilitating the ordering of supplies, the system comprising:
   (a) a supply ordering facilitator, the supply ordering facilitator comprising a central controller;
   (b) a supply requestor, the supply requestor comprising a first compute device in electrical communication with the central controller, the supply requestor creating a native supply list with one or more items, the native supply list being received by the supply ordering facilitator, the central controller translating the native supply list into an electronic supply list on a standardized electronic platform, the electronic supply list being stored by the supply ordering facilitator;
   (c) a supply purchaser, the supply purchaser comprising a second compute device in electrical communication with the central controller, the supply purchaser retrieving the electronic supply list from the central controller using the second compute device; and
   (d) a retailer, the retailer comprising a server in electrical communication with each of the central controller and the second compute device, the server supporting an e-commerce shopping platform;
   (e) wherein the supply ordering facilitator maintains an item registry table for translating the native supply list into an electronic supply list, the item registry table assigning at least one Universal Product Code (UPC) for each item, the supply ordering facilitator assigning multiple UPCs in the electronic supply list for each of the one or more items in the native supply list using the item registry table, the multiple UPCs being ranked in order in the item registry table;
   (f) wherein the central controller is adapted to directly integrate the electronic supply list into a virtual shopping cart in the e-commerce shopping platform.

2. The supply ordering system as claimed in claim 1 wherein the item registry table categorizes and hierarchically associates items.

3. The supply ordering system as claimed in claim 2 wherein the item registry table associates items using a nested set model.

4. The supply ordering system as claimed in claim 1 wherein the ranked order of the multiple UPCs in the item registry table is modifiable by the retailer.

5. The supply ordering system as claimed in claim 1 wherein the supply requestor creates the native supply list through a designated application on the first compute device.

6. The supply ordering system as claimed in claim 5 wherein the application on the first compute device allows for the incorporation of personalized content in the native supply list.

7. The supply ordering system as claimed in claim 6 wherein personalized content in the native supply list is preserved in the electronic supply list.

8. The supply ordering system as claimed in claim 1 wherein integration of the electronic supply list into the virtual shopping cart is initiated by the supply purchaser.

9. The supply ordering system as claimed in claim 8 wherein integration of the electronic supply list into the virtual shopping cart is initiated through a one-click process.

10. The supply ordering system as claimed in claim 9 wherein order placement is fulfilled by the supply purchaser using the second compute device.

11. The supply ordering system as claimed in claim 1 wherein modifications to the electronic supply list are reflected in real time.

12. The supply ordering system as claimed in claim 1 wherein the electronic supply list is retrievable from the central controller by the retailer.

* * * * *